June 29, 1948.  F. SRAGAL  2,444,272
VEHICLE BRAKE AND JACK SYSTEM
Filed July 30, 1945  2 Sheets-Sheet 1
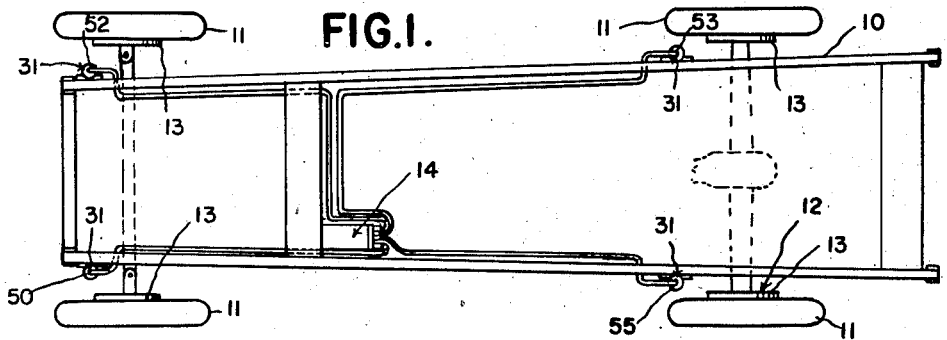
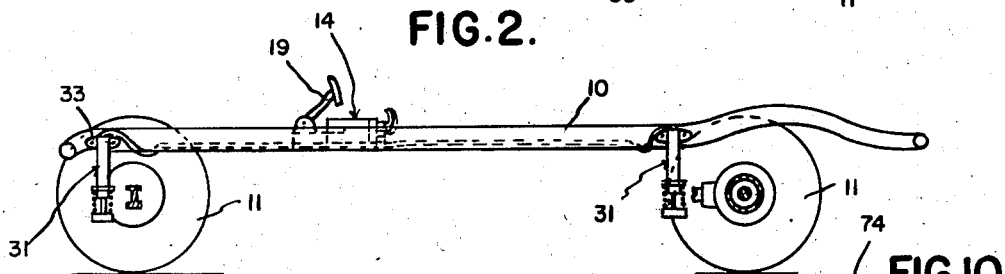
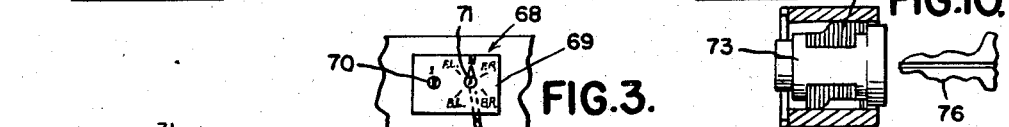
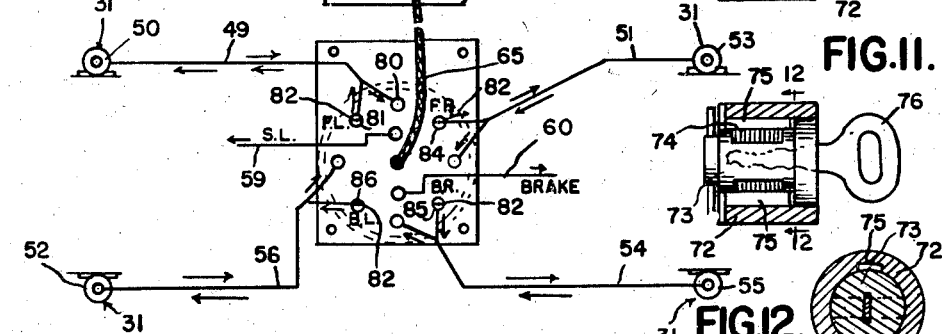
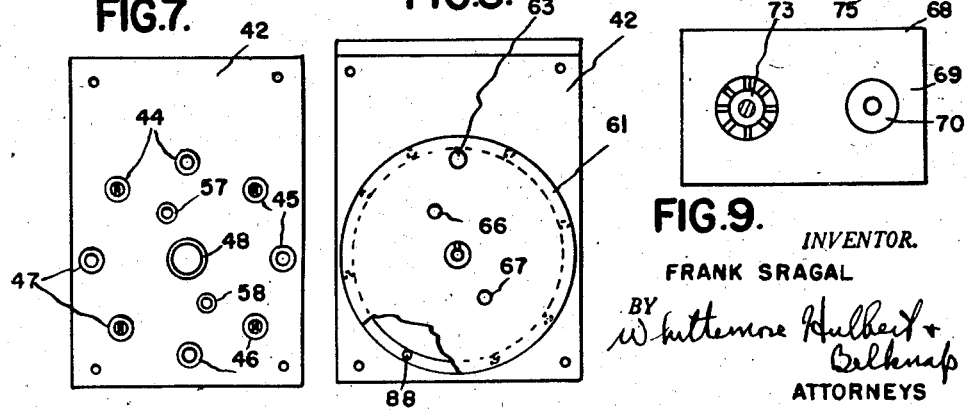
INVENTOR.
FRANK SRAGAL
BY Whittemore Hulbert + Belknap
ATTORNEYS June 29, 1948.                F. SRAGAL                    2,444,272
                         VEHICLE BRAKE AND JACK SYSTEM
Filed July 30, 1945                                    2 Sheets-Sheet 2
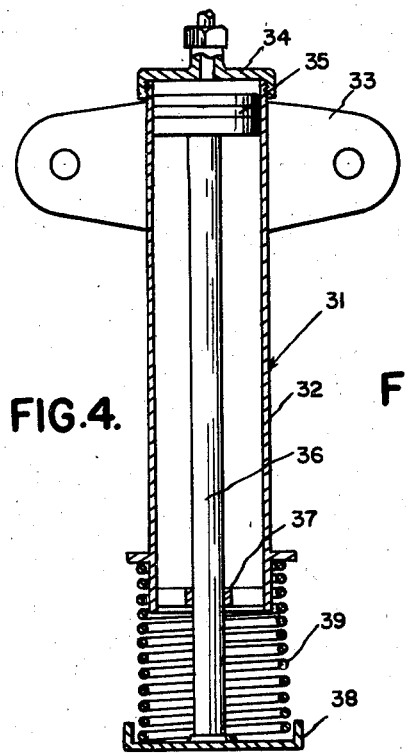
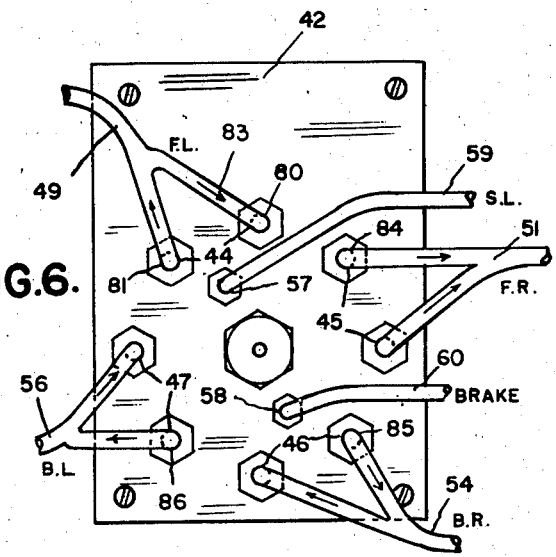
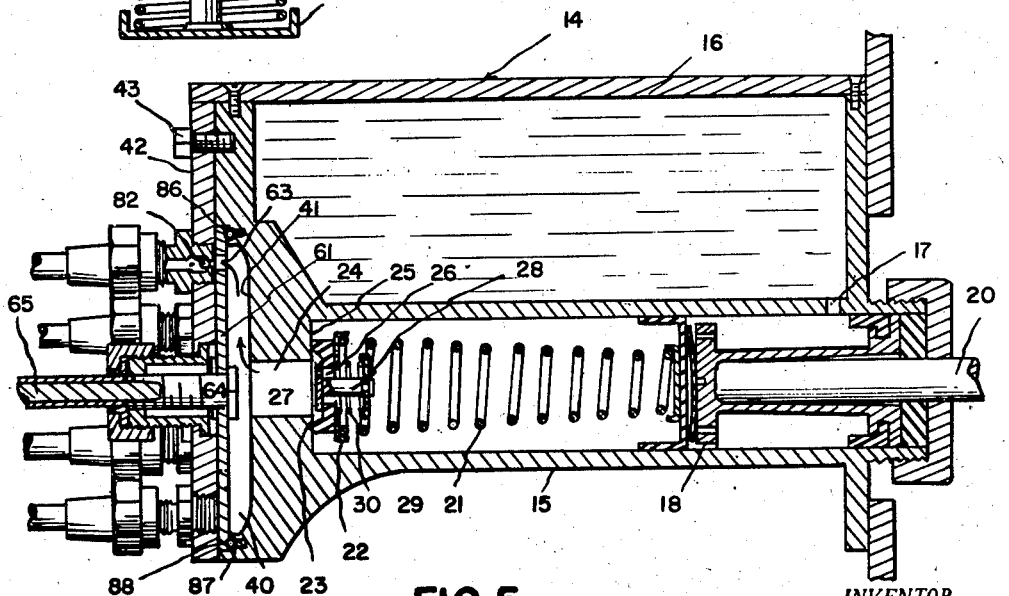
INVENTOR.
FRANK SRAGAL
BY
ATTORNEYS Patented June 29, 1948

2,444,272

UNITED STATES PATENT OFFICE 2,444,272

VEHICLE BRAKE AND JACK SYSTEM

Frank Sragal, Detroit, Mich.

Application July 30, 1945, Serial No. 607,802

4 Claims. (Cl. 303—6)

1

This invention relates generally to motor vehicles and refers more particularly to vehicles equipped with hydraulic brake systems.

One object of this invention is to provide a vehicle equipped with hydraulic jacks for raising the ground engaging wheels of the vehicle off the ground and having means accessible from a position within the vehicle body for selectively operating the jacks.

Another object of this invention is to connect the hydraulic jacks in the conventional hydraulic brake system in a manner to enable hydraulic fluid medium under pressure to be supplied to the jacks by the usual manually operable master cylinder forming a part of the brake system.

Still another object of this invention is to provide a selector conveniently located in the vehicle body for operating the hydraulic jacks and normally locked in a position wherein the master cylinder is connected to the brakes and associated stop-light switch.

A further object of this invention is to provide a selector of the above type requiring the use of the ignition key and having provision for preventing withdrawal of the key except when the selector is in a position to operatively connect the master cylinder to the brakes and stop-light switch. Thus, accidental operation of the vehicle while any one of the ground engaging wheels is in its raised position is prevented.

The foregoing as well as other objects, will be made more apparent as this description proceeds, especially when considered in connection with the accompanying drawings, wherein:

Figure 1 is a diagrammatic plan view of a vehicle equipped with hydraulic jacks embodying this invention;

Figure 2 is a side elevation of the vehicle shown in Figure 1;

Figure 3 is a diagram illustrating the control for the hydraulic jacks;

Figure 4 is a longitudinal sectional view through one of the hydraulic jacks;

Figure 5 is a longitudinal sectional view through a master cylinder equipped with the control mechanism for the hydraulic jacks;

Figure 6 is an end elevation of the master cylinder;

Figure 7 is an elevation of one of the control parts;

Figure 8 is an elevational view of still another of the control parts;

Figure 9 is a rear elevation of the selector plate;

2

Figure 10 is a sectional view of the lock employed in connection with the selector;

Figure 11 is a view similar to Figure 10 showing the lock mechanism in another position; and Figure 12 is a cross-sectional view taken on the plane indicated by the line 12—12 of Figure 11.

Referring now more in detail to the drawings, it will be noted that the vehicle diagrammatically illustrated in Figures 1 and 2 comprises a frame 10, ground engaging wheels 11 and a hydraulic braking system 12. The hydraulic braking system 12 comprises a friction brake 13 of any accepted design for each ground engaging wheel 11 and a master cylinder 14 suitably supported on the frame 10 of the vehicle.

Upon reference to Figure 5 of the drawings, it will be noted that the master cylinder 14 is of orthodox design in that it is provided with a cylinder 15 and a reservoir 16 communicating with the cylinder through a port 17. A piston 18 is supported in the cylinder 15 for sliding movement and is connected to a brake pedal 19 by a rod 20. The piston is normally urged to its retracted position by means of a coil spring 21 having one end engaging the piston and having the opposite end engaging an abutment 22. The abutment 22 is formed of a resilient material and is provided with an annular seat 23 which surrounds the outlet port 24 in the end wall 25 of the cylinder. The annular seat 23 is urged into engagement with the end wall 25 by the spring 21 and is provided with a central opening 26 in alignment with the outlet port 24 which is normally closed by a valve disk 27. The disk 27 is provided with a projection 28 which extends axially inwardly through the opening 26 and has an abutment 29 secured to the free end thereof. A coil spring 30 is located between the abutment 29 and the valve member 22 for normally holding the disk 27 in closed relation to the opening 26.

With the above construction, it will be noted that downward movement of the brake pedal 19 moves the piston 18 against the action of the spring 21 and displaces hydraulic fluid medium in the cylinder 15 in a direction to open the disk valve 27 against the action of the spring 30. As a result, hydraulic fluid medium is displaced through the outlet opening 24. As will be presently set forth, the outlet opening 24 is normally connected to the brakes 13 and the stop-light switch (not shown) for operating the latter. Upon release of the brake operating pedal 19, the spring 21 returns the piston and hydraulic fluid medium flows from the reservoir into the cylinder 15 in advance of the piston in the event additional fluid is required in the braking system.

Supported on the vehicle frame 10 adjacent each ground-engaging wheel is a hydraulic jack 31. This jack comprises a cylinder 32 having a bracket 33 at the upper end attachable to the vehicle frame and having a cap 34 for closing the upper end of the cylinder. A piston 35 is slidably mounted in the cylinder and is connected to a downwardly extending rod 36. The rod 36 projects through the lower end of the cylinder 32 and is slidably supported by a guide 37 which is fixed to the lower end of the cylinder. The extreme lower end of the rod 36 is connected to a ground engaging pad 38 and a tension spring 39 is provided for normally urging the rod or piston in its uppermost position in the cylinder 32 wherein the ground engaging pad 38 is spaced substantially above the ground.

The upper ends of the jack cylinders 32 are respectively connected to a chamber 40 formed by a recess 41 in the rear wall of the master cylinder and a plate 42, which is clamped to the rear wall by studs 43. The chamber 40 is in direct communication with the outlet port 24 in order to receive hydraulic fluid medium from the master cylinder upon manipulation of the brake pedal 19. As shown in Figures 6 and 7 of the drawings, the plate 42 comprises four sets of ports indicated by the reference characters 44, 45, 46 and 47. These ports are concentrically arranged with respect to an opening 48 in the plate 42 and are circumferentially spaced from each other. The pair of ports 44 are connected to a conduit 49 having the opposite end communicating with the upper end of the left front jack cylinder 50. The pair of ports 45 communicate with a conduit 51 having the opposite end connected to the right front jack cylinder 52. The back right jack cylinder 53 is connected to the pair of ports 46 by a conduit 54 and the back left jack cylinder 55 is connected to the pair of ports 47 by a conduit 56. It will further be noted from Figures 6 and 7 of the drawings that the plate 42 is provided with a pair of ports 57 and 58 at diametrically opposite sides of the opening 48. The port 57 is connected to the usual stoplight switch (not shown) by a conduit 59 and the port 58 is connected to the brakes 15 of the vehicle by a conduit 60.

The flow of hydraulic fluid medium through the ports in the plate 42 is controlled by a rotary disk valve 61 supported in the chamber 40 against the inner surface of the plate 42 and having an opening 63 successively registerable with the ports 44 to 47 inclusive. The disk 61 is secured to a shaft 64 which is journalled in the opening 48 in the plate 42 and is connected to a flexible cable 65 for rotation by the latter. As shown particularly in Figure 8 of the drawings, the valve disk 61 is further provided with a pair of openings 66 and 67 respectively registerable with the ports 57 and 58 in the plate 42.

It is pointed out at this time that when the valve disk 61 is in a position wherein the openings 66 and 67 respectively register with the ports 57 and 58, the opening 63 is in a neutral position, or in other words, is out of registration with any one of the ports 44 to 47 inclusive. Thus, in the normal position of the valve disk 61, the master cylinder is connected to the brakes 13 and the stop-light switch (not shown).

The valve disk 61 is operated by a selector 68 supported in a convenient position in the vehicle and having a plate 69, which also includes the ignition switch lock 70. The selector 68 is further provided with a key-operated pointer 71 suitably connected to the cable 65 for rotating the disk 61. The lock mechanism for the selector or pointer 71 is indicated in Figures 9 to 10 inclusive of the drawings and is identical to the ignition lock 70, so that the same key will serve for both locks.

As shown in Figures 9 to 12 inclusive, the lock comprises a tubular casing 72 and a barrel 73 rotatably supported in the casing. The barrel 73 carries tumblers 74 which are adapted to project into diametrically opposed recesses 75 formed in the inner surface of the casing. The arrangement is such that when the key 76 is inserted in the barrel, the tumblers 74 are retracted radially inwardly from the recesses 75 and the barrel 73 may be rotated to correspondingly rotate the pointer and cable 65. Suitable indicia is provided on the front face of the plate 69 to indicate the various positions at which the pointer must be moved in order to effect the desired operation. It will be noted that the key 76 can only be retracted from the lock when the pointer is in the position shown in Figure 3 of the drawing, wherein it indicates the letter "N." When the pointer is in this position, the disk valve 61 is in its neutral position wherein the master cylinder is connected to the brakes 13 and stop-light switch. In all other positions, the key 76 is retained in the lock for the selector, and since this key must be used to turn on the ignition, it follows that the danger of accidentally operating the vehicle when one of the jacks is in its raised position is prevented.

From the foregoing it will be noted that when it is desired to operate the left front jack 50, the selector is rotated from the position shown in Figure 3 to the left, so that the pointer indicates the indicia "FL". During the above rotation of the selector, the disk valve 61 is rotated by the cable 65 to close the ports 57 and 58 and to register the opening 63 with the receiving port 81 of the pair of ports 44. Thus the receiving port 81 is connected to the chamber 40 and outlet opening 24 in the master cylinder. The operator then merely manipulates the brake pedal 19 to displace hydraulic fluid medium through the port 81 and conduit 49 to the upper end of the hydraulic jack 50. This jack is then operated to lower the pad into engagement with the ground and to raise the left front wheel 11 of the vehicle off the ground. In order to prevent return of fluid to the master cylinder when the latter is released by the brake pedal, a check valve 82 is provided in the receiving port 81. Although the conduit 49 is also connected to the return port 80 by the branch 83, fluid is prevented from escaping through this port by the disk valve 61 and the jack 50 is thereby fluid locked in its operative position. On the other hand, when it is desired to lower the left front vehicle wheel, the disk 61 is rotated by the selector to register the opening 63 with the return port 80. This action relieves the pressure on the piston of the jack 50 and permits fluid from the jack cylinder to flow past the check valve 82 to the master cylinder under the force produced by the tension spring 39. As a result, the ground engaging pad on the jack 50 is lifted by the spring 39 to its raised position.

It will be understood from the foregoing that the receiving ports 84, 85 and 86 of the pairs of ports 45 to 47, inclusive, are provided with similar check valves and that the same procedure outlined above is followed in raising and lowering the jacks associated with these ports. Attention is also called to the fact that the disk valve is yieldably held in each of its various positions of adjustment by a spring-pressed detent 87 supported in the end wall of the master cylinder adjacent the periphery of the disk valve for successively engaging in recesses 88 formed in the adjacent face of the disk.

What I claim as my invention is:

1. In a vehicle having ground engaging wheels, the combination with a hydraulic brake system for the wheels including a master cylinder and a hydraulic brake for each wheel, of a hydraulic jack carried by the vehicle adjacent each ground engaging wheel, a chamber communicating with the master cylinder and having an end wall provided with pairs of openings spaced from each other along a circle, one opening of each pair being a receiving opening and the other being a return opening, conduits respectively connecting the pairs of openings to the hydraulic jacks, a valve having a disk supported in the chamber for rotation and having an opening successively registrable with the openings in said end wall of the chamber, means for operating the valve disk to selectively register the opening therethrough with the openings in said end wall, and a check valve in the receiving opening to prevent the return of fluid therethrough.

2. In a vehicle having ground engaging wheels, the combination with a hydraulic brake system for the wheels including a master cylinder and a hydraulic brake for each wheel, of a hydraulic jack carried by the vehicle adjacent each ground engaging wheel, a chamber communicating with the master cylinder and having an end wall provided with pairs of openings spaced from each other along a circle, one opening of each pair being a return opening and the other opening being a receiving opening, conduits respectively connecting the pairs of openings to the hydraulic jacks, a valve having a disk supported in the chamber for rotation and having an opening successively registrable with the openings in said end wall of the chamber, means operable in an intermediate position of the disk wherein the opening in the latter is out of registration with said openings to connect the master cylinder to said brakes, and a check valve in the receiving opening to prevent the return of fluid therethrough.

3. In a vehicle having ground engaging wheels, the combination with a hydraulic brake system for the wheels including a master cylinder and a hydraulic brake for each wheel, of a hydraulic jack carried by the vehicle adjacent each ground engaging wheel, a chamber communicating with the master cylinder and having an end wall provided with pairs of openings spaced from each other along a circle, one opening of each pair being a return opening and the other opening being a receiving opening, conduits respectively connecting the pairs of openings to the hydraulic jacks, a valve having a disk supported in the chamber for rotation and having an opening successively registrable with the openings in said end wall of the chamber, means operable in an intermediate position of the disk wherein the opening in the latter is out of registration with said openings to connect the master cylinder to said brakes, key operated means for locking the disk in said intermediate position, and a check valve in the receiving opening to prevent the return of fluid therethrough.

4. In a vehicle having ground engaging wheels, the combination with a hydraulic brake system for the wheels including a master cylinder and a hydraulic brake for each wheel, of a hydraulic jack carried by the vehicle, a chamber communicating with the master cylinder and having a pair of openings, one opening of the pair being a receiving opening and the other being a return opening, conduits connecting the pair of openings to the hydraulic jack, a valve having a disk supported in the chamber for rotation and having an opening successively registrable with the openings in said end wall of the chamber, means for operating the valve disk to selectively register the opening therethrough with the openings in said end wall, and a check valve in the receiving opening to prevent the return of the fluid therethrough.

FRANK SRAGEL.

REFERENCES CITED

The following references are of record in the file of this patent:

UNITED STATES PATENTS

| Number | Name | Date |
|---|---|---|
| 1,682,781 | Gardner | Sept. 4, 1928 |
| 1,698,612 | Todd et al. | Jan. 8, 1929 |
| 2,035,336 | Oliver | Mar. 24, 1936 |
| 2,052,547 | Clench | Sept. 1, 1936 |